US009024928B2

(12) United States Patent
Domm

(10) Patent No.: US 9,024,928 B2
(45) Date of Patent: May 5, 2015

(54) SYSTEM AND METHOD FOR PRODUCING AN IMAGE HAVING HIGH DYNAMIC RANGE

(71) Applicant: Christie Digital Systems USA, Inc., Cypress, CA (US)

(72) Inventor: John Domm, Kitchener (CA)

(73) Assignee: Christie Digital Systems USA, Inc., Cypress, CA (US)

(*) Notice: Subject to any disclaimer, the term of this patent is extended or adjusted under 35 U.S.C. 154(b) by 90 days.

(21) Appl. No.: 13/802,133

(22) Filed: Mar. 13, 2013

(65) Prior Publication Data

US 2014/0267201 A1 Sep. 18, 2014

(51) Int. Cl.
| | |
|---|---|
| G06F 3/038 | (2013.01) |
| G02B 26/08 | (2006.01) |
| G03B 21/00 | (2006.01) |
| G03B 21/20 | (2006.01) |

(52) U.S. Cl.
CPC ............ *G02B 26/08* (2013.01); *G02B 26/0825* (2013.01); *G02B 26/0875* (2013.01); *G03B 21/00* (2013.01); *G03B 21/008* (2013.01); *G03B 21/204* (2013.01)

(58) Field of Classification Search
None
See application file for complete search history.

(56) References Cited

U.S. PATENT DOCUMENTS

| | | | |
|---|---|---|---|
| 4,492,435 A | 1/1985 | Banton et al. | |
| 5,311,360 A | 5/1994 | Bloom et al. | |
| 6,384,952 B1 | 5/2002 | Clark et al. | |
| 8,157,388 B2 * | 4/2012 | Bartlett et al. | 353/85 |
| 2009/0290132 A1 | 11/2009 | Shevlin | |
| 2011/0115989 A1 * | 5/2011 | Quinn | 345/690 |
| 2012/0200829 A1 | 8/2012 | Bronstein et al. | |

FOREIGN PATENT DOCUMENTS

| | | |
|---|---|---|
| EP | 0040302 A2 | 11/1985 |
| WO | 2011031334 A1 | 3/2011 |

OTHER PUBLICATIONS

Meng-Hsiung Kiang et al:, "Silicon-Micromachined Micromirrors with Integrated High-Precision Actuators for External-Cavity Semiconductor Lasers", IEEE Photonics Technology Letters, IEEE Service Center, Piscataway, NJ, US, vol. 8, No. 1, Jan. 1, 1996, XP011048047, I SSN: 1041-1135.
Corresponding European Patent Application No. 14158902.8, "Extended European Search Report," dated Jun. 11, 2014.

* cited by examiner

*Primary Examiner* — Muhammad N Edun
(74) *Attorney, Agent, or Firm* — Perry + Currier, Inc.

(57) ABSTRACT

A system and method for producing an image having high dynamic range is described. The system comprises: a light source for providing light along an optical path; a digital micromirror device for directing portions of the light to off-state and on-state light paths, thereby producing an image; and a deformable optical element disposed in the optical path between the light source and the digital micromirror device for steering at least some of the light from the off-state light path to the on-state light path to increase dynamic range of the image produced by the digital micromirror device. The deformable optical element can comprise at least one steerable segment and at least one static element.

16 Claims, 6 Drawing Sheets

SYSTEM AND METHOD FOR PRODUCING AN IMAGE HAVING HIGH DYNAMIC RANGE

FIELD

The specification relates generally to projection systems, and specifically to a system and method for producing an image having high dynamic range.

BACKGROUND

Current projection systems require that the illumination of the digital micromirror device (DMD) be uniform over the entire DMD imaging surface. In other words, the amount of light received by each mirror of the DMD is required by these systems to be generally equal, such that illumination of the brightest areas is limited by the overall illumination of the DMD mirrors. This can result in an image that is not a true representation of the original or desired image, particularly if that original or desired image constitutes an image having high dynamic range.

SUMMARY

According to one implementation, there is provided a system for producing an image having high dynamic range comprising: a light source for providing light along an optical path; a digital micromirror device for directing portions of the light to off-state and on-state light paths, thereby producing an image; and a deformable optical element disposed in the optical path between the light source and the digital micromirror device for steering at least some of the light from the off-state light path to the on-state light path to increase dynamic range of the image produced by the digital micromirror device.

According to another implementation, the deformable optical element comprises at least one steerable segment. According to a related implementation, the at least one steerable segment is independently steerable.

According to another implementation, the deformable optical element comprises at least one static element.

According to another implementation, the deformable optical element comprises an at least partially reflective element. According to a related implementation, the at least partially reflective element comprises one of a segmented mirror, an analog mirror, a dichroic mirror and an electrostatic deformable mirror.

According to one implementation, the deformable optical element comprises a transmissive element. According to a related implementation, the transmissive element comprises a lens. According to another related implementation, the lens comprises a variable lens.

According to one implementation, a shape of the deformable optical element comprises one of a square, a rectangle and a circle.

According to one implementation, the deformable optical element is configured to steer the at least some of the light from the off-state light path between +/−9 degrees to the off-state light path.

According to one implementation, the system for producing an image having high dynamic range further comprises: a drive system for configuring the digital micromirror device to produce the image based on image content data; and wherein the drive system configures the deformable optical element to steer the at least some light from the off-state light path to the on-state light path based on the image content data. According to a related implementation, the image content data comprises high dynamic image content data.

According to one implementation, the system for producing an image having high dynamic range further comprises an additional deformable optical element disposed in the optical path between the light source and the digital micromirror device.

According to one implementation, the light source comprises a laser light module.

According to one implementation, there is provided a method for producing an image having high dynamic range comprising: providing light along an optical path; directing portions of the light to off-state and on-state light paths, thereby producing an image; and steering at least some of the light from the off-state light path to the on-state light path to increase dynamic range of the image.

According to one implementation, the steering comprises steering the at least some of the light from the off-state light path between −+/−9 degrees to the off-state light path.

According to one implementation, the steering comprises articulating at least one steerable segment of a deformable optical element disposed in the optical path.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
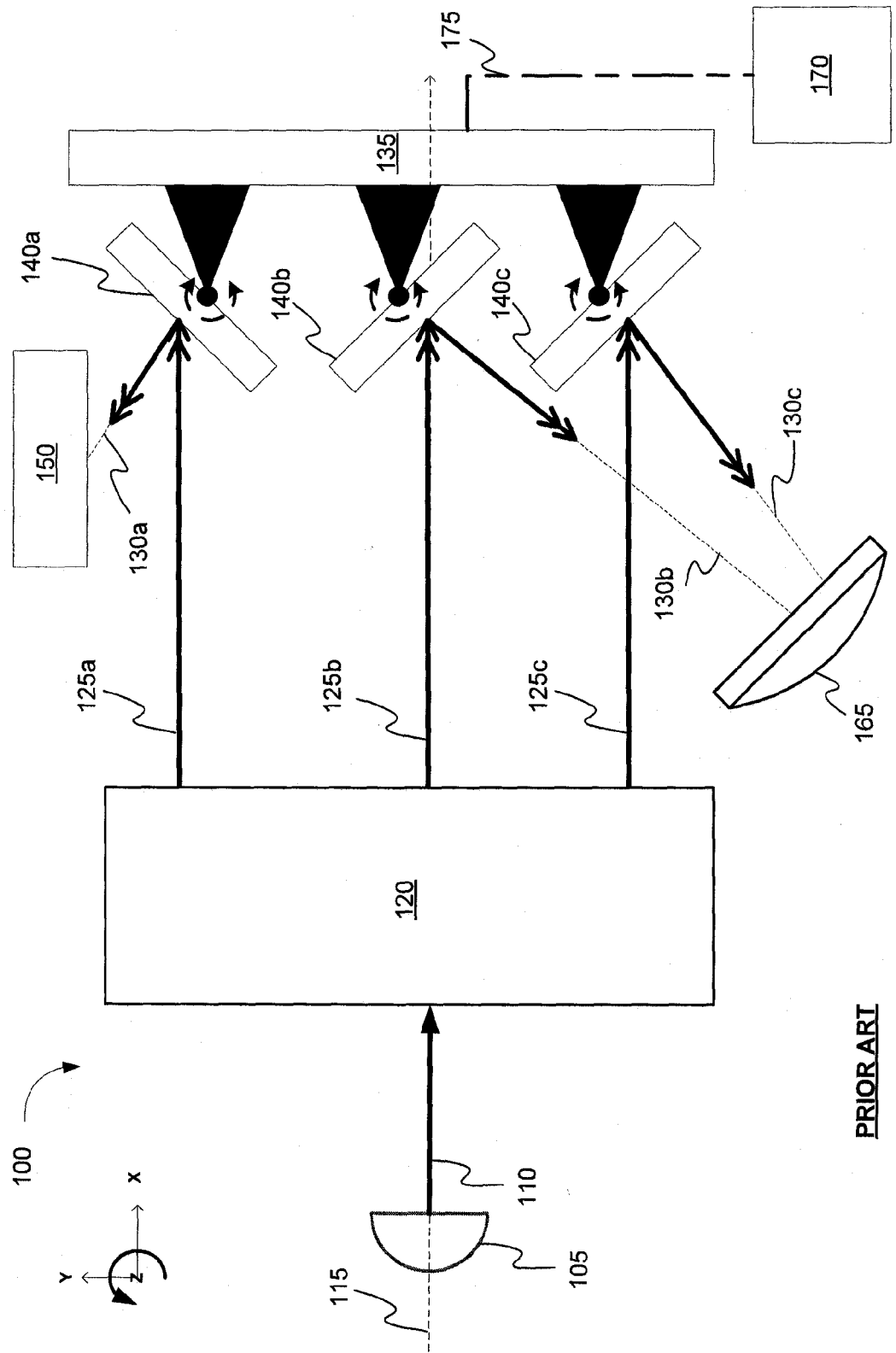
FIG. 1 depicts a schematic representation of a projection system, according to a prior art implementation.

FIG. 1 depicts a schematic representation of prior art projection system 100. Projection system 100 comprises light source 105 that provides (e.g. transmits) light 110 along optical path 115. According to some implementations, light source 105 comprises a lamp, such as a Xenon lamp and a parabolic reflector. According to some implementations, light source 105 comprises a laser light module. Light 110 is transmitted to intermediate optics 120. Intermediate optics 120 modulates light 110 to produce light cones 125a, 125b and 125c, referred to collectively as light cones 125 and depicted as arrows for simplicity. Intermediate optics 120 can include, for example, one or more integrating rods, prisms, relay lenses and mirrors. It is understood that light 110 comprises the light of light cones 125a, 125b and 125c. In other words, light cones 125a, 125b and 125c are portions or subsets of light 110.

Each of light cones 125a, 125b and 125c is provided along a respective optical path 130a, 130b and 130c (also referred to as light paths 130a, 130b and 130c). Although optical paths 115 and 130b appear to be at least initially collinear, according to some implementations, none of light cones 125a, 125b and 125c have an optical path that is collinear with optical path 115. Alternatively, according to some implementations, one or more of optical paths 130a, 130b and 130c may be collinear with optical path 115. Furthermore, although only three light cones are depicted in FIG. 1, according to some implementations two or more light cones, including more than three light cones, are transmitted by intermediate optics 120.

It will be understood that the terms "light path" and "optical path" are used herein to denote the path along which light can and may travel in the system. As a result, unless otherwise indicated, the terms "light path" and "optical path" will be considered interchangeable with each other.

Light cones 125 are transmitted to Digital Micromirror Device (DMD) 135. DMD 135 can be provided by, for example, Texas Instruments™. For simplicity, DMD 135 is depicted as having three mirrors, referred to individually as mirrors 140a, 140b and 140c and collectively as mirrors 140, for receiving light, such as light cones 125, and producing an image based upon at least one received light cone. Each one of the mirrors 140 corresponds to a pixel of the produced image. According to some implementations, DMD 135 will have more than three mirrors arranged in a grid pattern. For example, DMD 335 can be a 4K resolution DMD having a resolution of 4096×2160 pixels and over 8 million micromirrors in a grid pattern.

Mirrors 140 can be independently switched (i.e. actuated) to an OFF-state, in which the received light is not transmitted to projection optics 165, and an ON-state, in which the received light is transmitted to projection optics 165. For example, as depicted in FIG. 1, light cone 125a is received by mirror 140a, which directs the received light cone 125a towards light dump 150. Since optical path 130a is an optical or light path light cone 125a travels or is transmitted along to an OFF-state DMD mirror (mirror 140a), optical path 130a will be considered an OFF-state optical or light path. In other words, by virtue of being an optical or light path destined for an OFF-state DMD mirror or region other than for being transmitted to projection optics 165 (such as directly to a light dump), such an optical or light path is considered, for the purposes of this disclosure, to be an OFF-state optical or light path. According to some implementations, one or more of DMD mirrors 140b and 140c are switched to an OFF-state, which would then result in the respective one or more optical paths 130b and 130c becoming OFF-state optical or light path(s). According to some implementations, mirror 140a is switched to an ON-state, which would then result in optical path 130a becoming an ON-state light path.

In a DMD imaging device, such as prior art projection system 100 and as exemplified by the Digital Light Processing (DLP™) technology of Texas Instruments, they dynamic range of a projected image is limited by the switching speed of the DMD. Grey scale aspects of the image are created using pulse width modulation (PWM) techniques. Thus, for a DMD device full white is achieved by leaving the DMD mirrors, such as mirrors 140a, 140b and 140c, in the ON-state for the duration of the DMD mirror duty cycle, full black is achieved by leaving the mirrors in the OFF-state for the DMD mirror duty cycle, while minimal grey is achieved by having the mirrors in the ON-state for the shortest period of time during the DMD duty cycle that can be supported by the DMD (known as the "Load Time"). In other words, the portion of the duty cycle each DMD mirror spends in a particular state dictates the intensity ("brightness") of the pixel.

Light cones 125b and 125c are received and directed by mirrors 140b, 140c to projection optics 165 where the resulting image may be projected onto a screen (not shown). Contrary to optical path 130a, since optical paths 130b and 130c are optical or light paths along which light cones 125b and 125c travel or are transmitted to an ON-state DMD mirror (mirrors 140b, 140c), optical paths 130b and 130c are considered, in the system 100, to be ON-state optical or light paths. Although FIG. 1 depicts each one of light cones 125a, 125b and 125c being received and directed by a different one of mirrors 140a, 140b and 140c, in some implementations, each one of mirrors can receive and direct more than one of light cones 125a, 125b and 125c. Projection system 100 further includes drive system 170 in communication with DMD 135 via communication path 175. Drive system 170 configures DMD 135 to produce an image by, for example, switching mirrors 140 between an ON-state and an OFF-state based on the above-described PWM techniques.

Projection system 100 may also include additional light dumps or analogous devices (not shown) to absorb any light spillage from light cones 125 as received or directed by DMD 135 via mirrors 140. Furthermore, projection system 100 can comprise additional light directing and/or directing devices specifically included for the purpose of directing light to OFF-state light paths or regions. For example, projection system 100 can include an additional DMD to help direct light OFF-state.

Figure 2C:
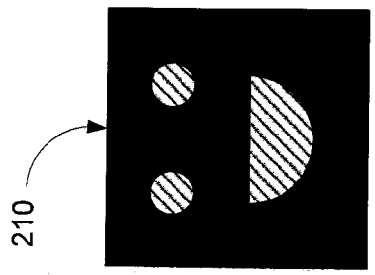
FIG. 2c depicts the desired image as produced by the DMD of FIG. 2c.
Figure 2B:
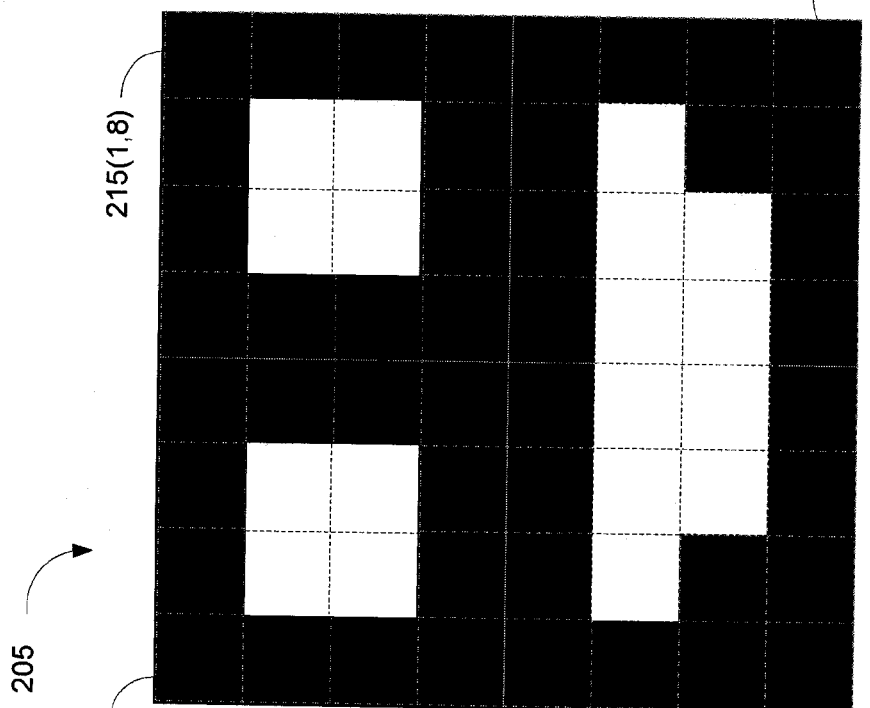
FIG. 2b depicts a front view of a representative digital micromirror device (DMD) configured to produce the desired image of FIG. 2a, according to a prior art implementation.
Figure 2A:
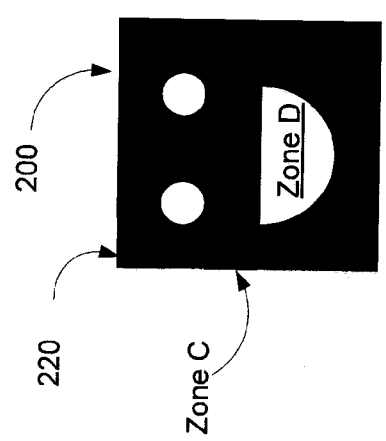
FIG. 2a depicts a desired image to be projected by a digital projection system according to a prior art implementation.

Reference is now made to FIGS. 2a, 2b and 2c, depicting desired image 200, DMD 205 and image 210, produced by DMD 205, to illustrate disadvantages of prior art projection systems, such as projection system 100. DMD 205 includes set of mirrors 215 comprised of mirrors 215(1,1) to 215(8,8). It would be understood that the configuration of the set of mirrors 215 is not limited to an 8×8 configuration, but any suitable configuration of mirrors 215 can be used. Each one of mirrors 215(1,1) to 215(8,8) corresponds to a pixel of image 210.

As shown in FIG. 2a, desired image 200 includes both bright and dark areas (or zones). In order to produce an image based upon desired image 200, DMD 205, and particularly mirrors 215(1,1) to 215(8,8) are switched to direct the received light to OFF-state and ON-state optical paths. Dark zones of desired image 200 (e.g. Zone C) correspond to OFF-state mirrors (e.g. mirrors 215(4,1), 215(4,2), 215(5,1) and 215(5,2)) and bright zones (e.g. Zone D) correspond to ON-state mirrors (e.g. mirrors 215(6,2) to 215(6, 7) and 215(7,3) to 215(7,6)) of the set of mirrors 215. For example, dark zone 220 corresponds to mirror 215(1,1).

Prior art projection systems and devices, such as projection system 100 and DMD 205, require that the illumination of the DMD be uniform over the entire DMD imaging surface. In other words, the amount of light received by each mirror of the DMD (e.g. mirrors 140 and 215(1,1) to 215(8,8)) is required by these systems to be generally equal. This results in the illumination of the brightest areas being limited by the overall illumination of the DMD mirrors. This may, in some cases, not result in an image that is a true representation of the original or desired image, particularly if that original or desired image constitutes an image having high dynamic range. For example, in image 210 produced by DMD 205, the brightest areas (represented by the hashed lines) are not as bright as the brightest areas of desired image 200.

Figure 3:
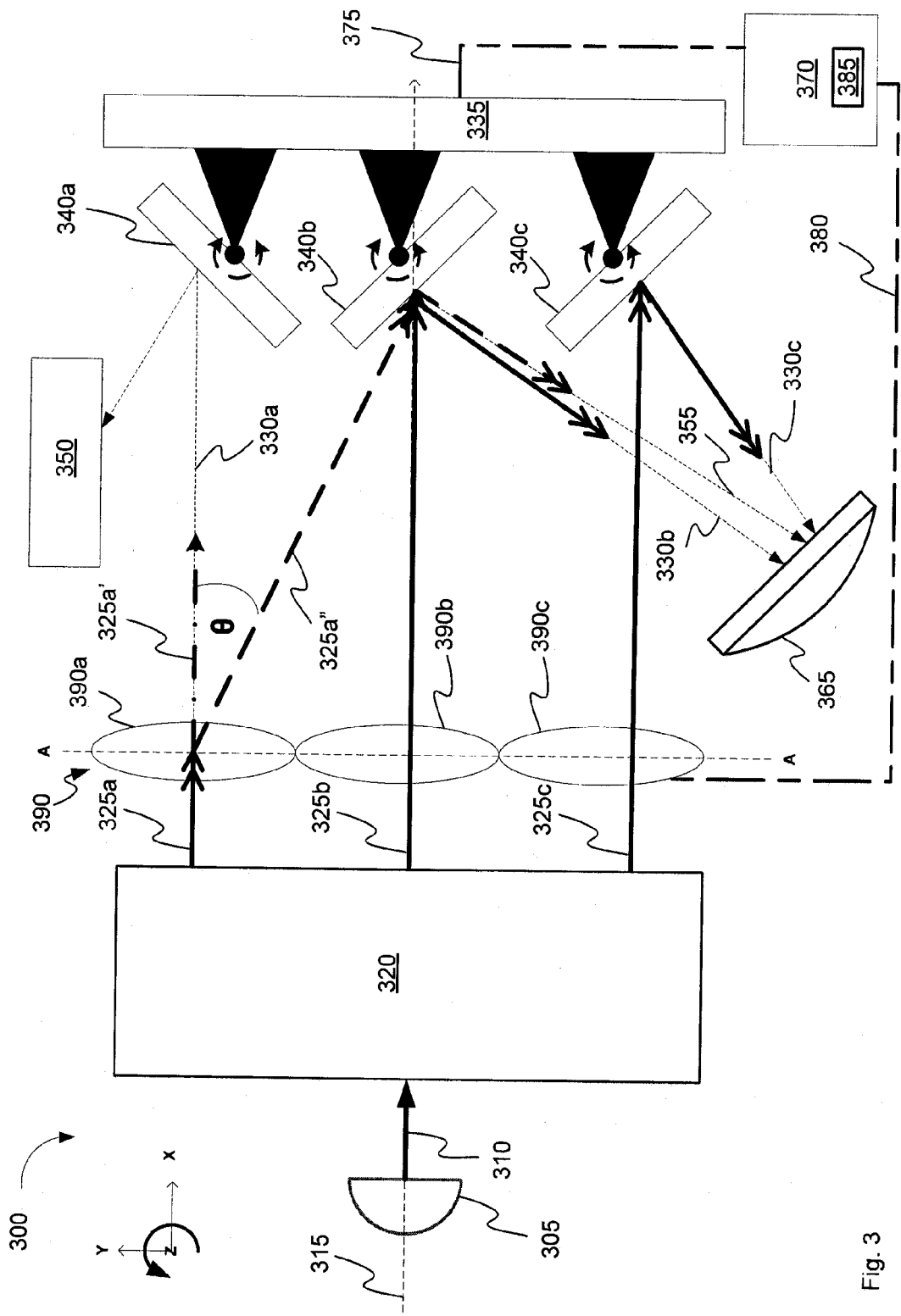
FIG. 3 depicts a schematic representation of a system for producing an image having high dynamic range, according to a non-limiting implementation.

Attention is directed to FIG. 3, depicting system 300 for producing an image having high dynamic range according to non-limiting implementations and comprising elements similar to FIG. 1, with like elements having like numbers, however starting with a "3" rather than a "1". For example, system 300 includes a light source 305 which provides or transmits light 310 along optical path 315. According to some implementations, light source 305 is a laser light module. According to other implementations, light source 305 comprises a lamp, such as a Xenon lamp having a parabolic reflector. Light 310 is received by intermediate optics 320, which modulates light 310 to produce light cones 325a, 325b and 325c along respective optical paths 330a, 330b and 330c, at least initially. As in system 100, DMD 335, is comprised of mirrors 340a, 340b and 340c, referred to collectively as mirrors 340, which directs light cones 325, as portions of light 310, to OFF-state and ON-state light paths, thereby producing an image.

As will be presently understood, system 300 allows for at least some of the light that is initially directed for transmission along an OFF-state light path (i.e. towards a "dark zone" or OFF-state DMD mirror(s)) to be steered or otherwise diverted from an OFF-state light path to an ON-state light path (i.e. towards a "bright zone" or ON-state DMD mirror(s)). As a result, more total light is directed towards the projection optics from ON-state DMD mirrors that are in a state to produce the bright zones of the image, thereby creating brighter bright zones of the image and increasing the dynamic range of the image produced by the DMD. Since less light that is transmitted by the light source is being diverted to the light dump or is otherwise not being utilized to produce the image, system 300 results in a more efficient use of system resources and energy.

Deformable optical element 390 comprises a transmissive optical element and is disposed in optical path 330a (and optical path 315) between light source 305 and DMD 335 at plane A-A. For example, deformable optical element 390 can comprise one or more lenses. According to one implementation, deformable optical element 390 comprises at least one liquid-crystal variable lens. In the implementation shown in FIG. 3, deformable optical element 390 comprises three segments, 390a, 390b and 390c, each one corresponding to a different zone of the image produced by DMD 335. For simplicity, in the implementation shown in FIG. 3, DMD 335 also has three zones, each zone corresponding to one of mirrors 340a, 340b and 340c. As in system 100, each one of mirrors 340a, 340b and 340c corresponds to individual pixels of the image produced by DMD 335. In other words, in system 300, the number of zones of the produced image corresponds to the number of pixels. However, according to some implementations, the number of zones of the image and number of pixels, and therefore number of DMD mirrors, do not correspond to each other. For example, the produced image may have three zones, two bright zones and one dark zone, but the image could have thousands of pixels (corresponding to thousands of DMD mirrors).

It will be understood that the term "deformable" is used herein to denote altering the optical surface of the described element by, for example, changing or modifying the shape, structure, position or imaging state (e.g. in the case of an element comprising multiple micromirrors, switching between ON-/OFF-states) of at least a portion of the described element.

According to some implementations, one or more of segments 390a, 390b and 390c are independently steerable. According to some implementations, one or more of segments 390a, 390b and 390c are static. For example, segments 390a and 390c could be independently steerable and segment 390b static. As a result, in this example, light cones 325a and 325c can be steered; while light cone 325b will not be steered by deformable optical element 390 (i.e. light cone 325b continues to travel along optical path 330b to provide uniform illumination of DMD 335 in respect of light cone 325b). According to some implementations, deformable optical element 390 is configured to steer approximately half of light cones 325 while the remaining un-steered portion of light cones 325 provide uniform illumination of DMD 335 in respect of the remaining un-steered portion of light cones 325.

According to some implementations, deformable optical element 390 is disposed at a location along optical path 330a where light cones 325 are at least partially separated from each other. As shown in FIG. 3, deformable optical element 390 is configured to steer at least some of light cone 325a away from OFF-state light path 330a and onto ON-state light path 355 to increase the dynamic range of an image produced by DMD 335. According to some implementations, deformable optical element 390 is configured to steer at least some of light cone 325a by deforming or altering the shape of at least part of deformable optical element 390. For example, according to some implementations, deformable optical element 390 is configured to steer at least some of light cone 325a by pivoting or rotating at least one of segments 390a, 390b and 390c about a point, such at the intersection between segments 390a and 390b, thereby altering the overall shape of deformable optical element 390.

According to the implementation shown in FIG. 3, deformable optical element 390 is configured to steer at least some of light cone 325a away from OFF-state light path 330a and onto ON-state light path 355 at an angle $\theta$ ("theta") to optical path 330a (i.e. OFF-state light path 330a). According to some implementations, angle $\theta$ is between +/−9 degrees to optical path 330a. For example, if it was desired to steer at least a portion of light cone 325a from optical path 330a that is destined to mirror 140a, to mirror 140c, then based upon a distance of 220 mm between DMD 335 and deformable optical element 390 at plane A-A, and a distance between mirrors 140a and 140c (being the distance between light paths 330a and 330b), the steering angle $\theta$ for light cone 325a would be arc tan(34 mm/220 mm) 9 degrees. It is noted that for simplicity, steering angle $\theta$ is shown in FIG. 3 as an angle to the horizontal x-axis. However, depending on the desired steering and the configuration of system 300, steering angle $\theta$ can also be relative to the y-axis, z-axis or any combination of the x-axis, y-axis and z-axis. For example, the steering of one or more of light cones 325 can, for example, take place in 3 dimensional space.

In system 300, deformable optical element 390 is configured to steer at least some of light cone 325a, illustrated as portion of light cone 325a", to mirror 340b, which is in the ON-state as it is switched to direct received light to projection optics 365. According to some implementations, portion of light cone 325a" is steered to mirror 340c, which is also in the ON-state. According to some implementations, at least some of the remaining portion of light cone 325a, remainder 325a', continues to be transmitted along OFF-state light path 330a to be directed to light dump 350 by mirror 340a. According to some implementations, all of light cone 325a is steered onto ON-state light path 355 such that light cone 325a" has substantially the same intensity as light cone 325a. As shown in FIG. 3, light cones 325b and 325c are transmitted through deformable optical element 390 along optical light paths 330b and 330c, respectively.

Although deformable optical element 390 is shown as disposed along optical path 330a (and optical paths 330b and 330c), it will be understood that deformable optical element 390 can be placed in the optical path or paths of the particular light cone or cones that are to be steered. Furthermore, although deformable optical element 390 is shown as being configured to steer a portion of only one light cone, light cone 325a, according to some implementations, deformable optical element 390 is configured to steer a portion or portions of more than one light cone away from respective OFF-state light paths onto one or more ON-state light paths.

In general, the location of the deformable optical element along one or more optical paths is selected based upon the geometry of the light, such as the geometry of the light leaving the intermediate optics. For example, according to some implementations, deformable optical element 390 is placed at a plane in optical path 315 such that for a given point in the image produced by the DMD and the light cone corresponding to that point, approximately half of the light cone is steered from an OFF-state light path to an ON-state light path. As would be understood, determination of this location would be based on a determined f/# ("f-number") of the optical system with the deformable optical element located to produce the desired light steering. Furthermore, it will be understood that the number of zones of the DMD imaging surface from which light will be steered away will also have a bearing on the location of the deformable optical element.

Furthermore, according to some implementations, additional optics are disposed between deformable optical element 390 and DMD 335 to modulate light cones 325b, 325c and a portion of light cone 325a″.

Drive system 370 configures DMD 335 to produce the image based on image content data 385. Drive system 370 is in communication with DMD 335 via communication path 375. According to some implementations, drive system 370 is in two-way communication with DMD 335 (i.e. drive system 370 can communicate or transmit data to DMD 335 and, vice-versa, DMD 335 can communicate or transmit data to drive system 370). According to some implementations, the communication between drive system 370 and DMD 335 is one-way. However, any suitable manner of communication between drive system 370 and DMD 335 is contemplated. For example, drive system 370 can be remote from DMD 335 and communicate with DMD 335 wirelessly. In another example, drive system 370 and DMD 335 can be connected via wired connection and/or mechanical connection. Furthermore, although FIG. 3 depicts a particular path for communication between drive system 370 and DMD 335, it is contemplated that communication path 375 comprises any of one or more communication paths suitable for communication between drive system 370 and DMD 335. For example, communication path 375 can comprise any combination of wired and/or wireless communication paths as desired.

Drive system 370 also configures deformable optical element 390 to steer at least some of light cones 325 (e.g. light cone 325a) from an OFF-state light path (e.g. 330a) to an ON-state light path (e.g. 355) based on image content data 385. Drive system 370 is in communication with deformable optical element 390 via communication path 380. According to some implementations, drive system 370 is in two-way communication with deformable optical element 390 (i.e. drive system 370 can communicate or transmit data to deformable optical element 390 and, vice-versa, deformable optical element 390 can communicate or transmit data to drive system 370). According to some implementations, the communication between drive system 370 and deformable optical element 390 is one-way. However, any suitable manner of communication between drive system 370 and deformable optical element 390 is contemplated. For example, drive system 370 can be remote from deformable optical element 390 and communicate with deformable optical element 390 wirelessly. In another example, drive system 370 and deformable optical element 390 can be connected via wired connection and/or mechanical connection. Furthermore, although FIG. 3 depicts a particular path for communication between drive system 370 and deformable optical element 390, it is contemplated that communication path 380 comprises any of one or more communication paths suitable for communication between drive system 370 and deformable optical element 390. For example, communication path 380 can comprise any combination of wired and/or wireless communication paths as desired.

According to some implementations, drive system 370 comprises a computing device having a processor to configure DMD 335 and deformable optical element 390 based on image content data. According to some implementations, image content data 385 is stored at a local memory device of drive system 370. According to some implementations, image content data 385 is transmitted to drive system 370 or retrieved by drive system 370 from another device via a wired or remote connection. According to some implementations, image content data 385 comprises high dynamic image content data. The term "high dynamic image content data" is used herein to denote image content data associated with an image having a high dynamic range. It is understood that the term "high dynamic range" denotes a wide range of brightness.

Figure 4:
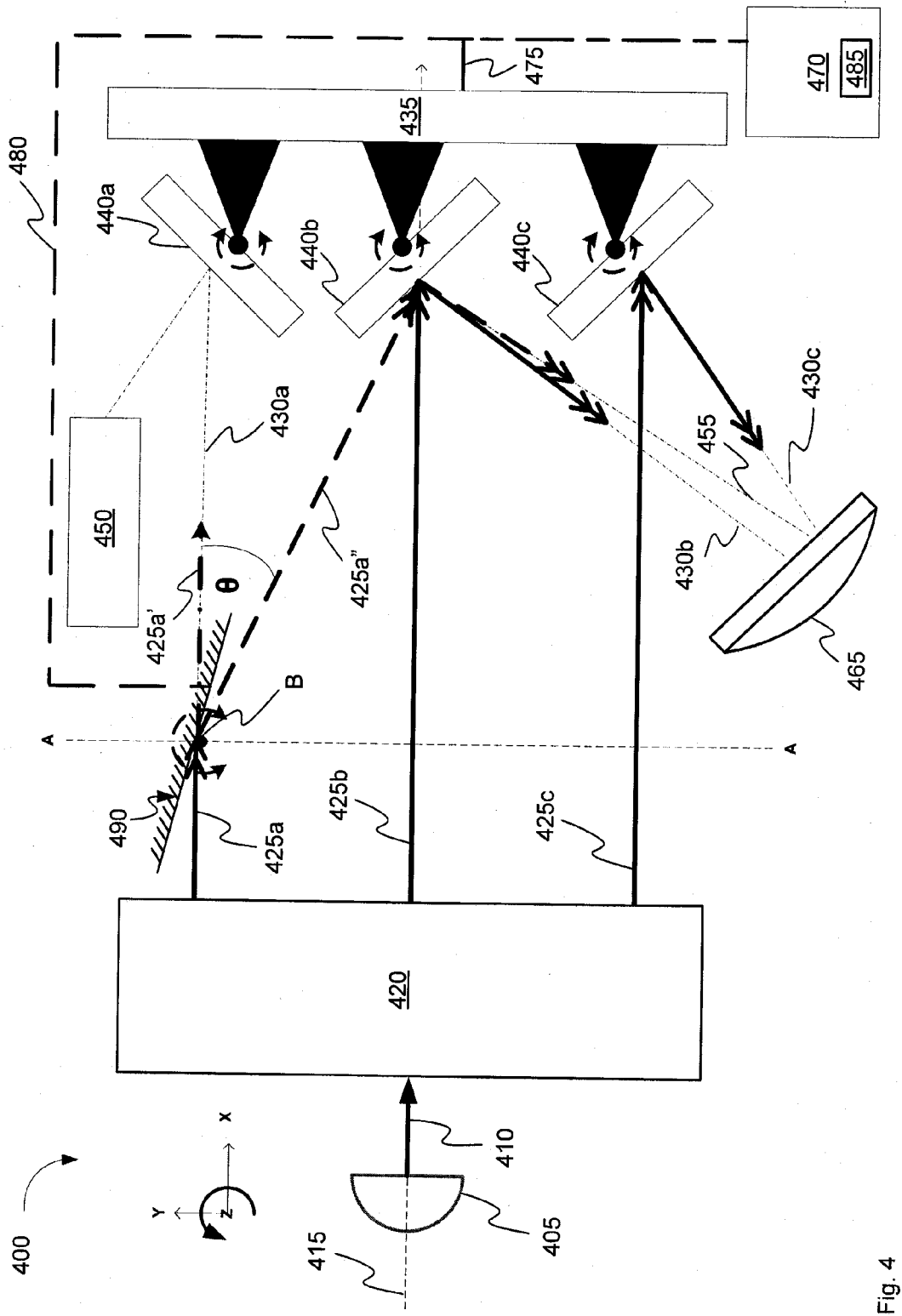
FIG. 4 depicts a schematic representation of a system for producing an image having high dynamic range, according to another non-limiting implementation.

Attention is directed to FIG. 4, depicting system 400 for producing an image having high dynamic range according to non-limiting implementations and comprising elements similar to FIG. 3, with like elements having like numbers, however starting with a "4" rather than a "3". For example, system 400 includes a light source 405 which provides or transmits light 410 along optical path 415. According to some implementations, light source 405 is a laser light module. According to other implementations, light source 405 comprises a lamp, such as a Xenon lamp having a parabolic reflector. Light 410 is received by intermediate optics 420, which modulates light 410 to produce light cones 425a, 425b and 425c along respective optical paths 430a, 430b and 430c, at least initially. As in system 300, DMD 435, comprised of mirrors 440a, 440b and 440c, referred to collectively as mirrors 440, directs light cones 425, as portions of light 410, to OFF-state and ON-state light paths, thereby producing an image.

In contrast to deformable optical element 390, deformable optical element 490 comprises an at least partially reflective element. For example, deformable optical element 490 can comprise a dichroic mirror or filter configured to steer at least a portion of light cone 425a, shown as portion of light cone 425a″, to ON-state light path 455 by reflection. Remainder 425a′ continues to be transmitted along OFF-state light path 430a towards mirror 440a, in an OFF-state, and ultimately to light dump 450. According to some implementations, all of light cone 425a is reflected to ON-state light path 455, and ultimately to projection optics 465.

According to some implementations, deformable optical element 490 is independently steerable. For example, deformable optical element 490 can alter its position by rotating or pivoting about a point, such as point B. According to some implementations, deformable optical element 490 comprises a single analog mirror. According to some implementations, deformable optical element 490 comprises more than one analog mirror. For example, deformable optical element 490 can comprise a set of micromirrors, at least a subset of which are independently steerable. As a result, the optical surface of deformable optical element 490 is deformed or altered to steer one or more of light cones 425a, 425b and 425c.

According to some implementations, deformable optical element 490 can comprise one of a segmented mirror, an analog mirror, a dichroic mirror and an electrostatic deformable mirror.

Figure 5:
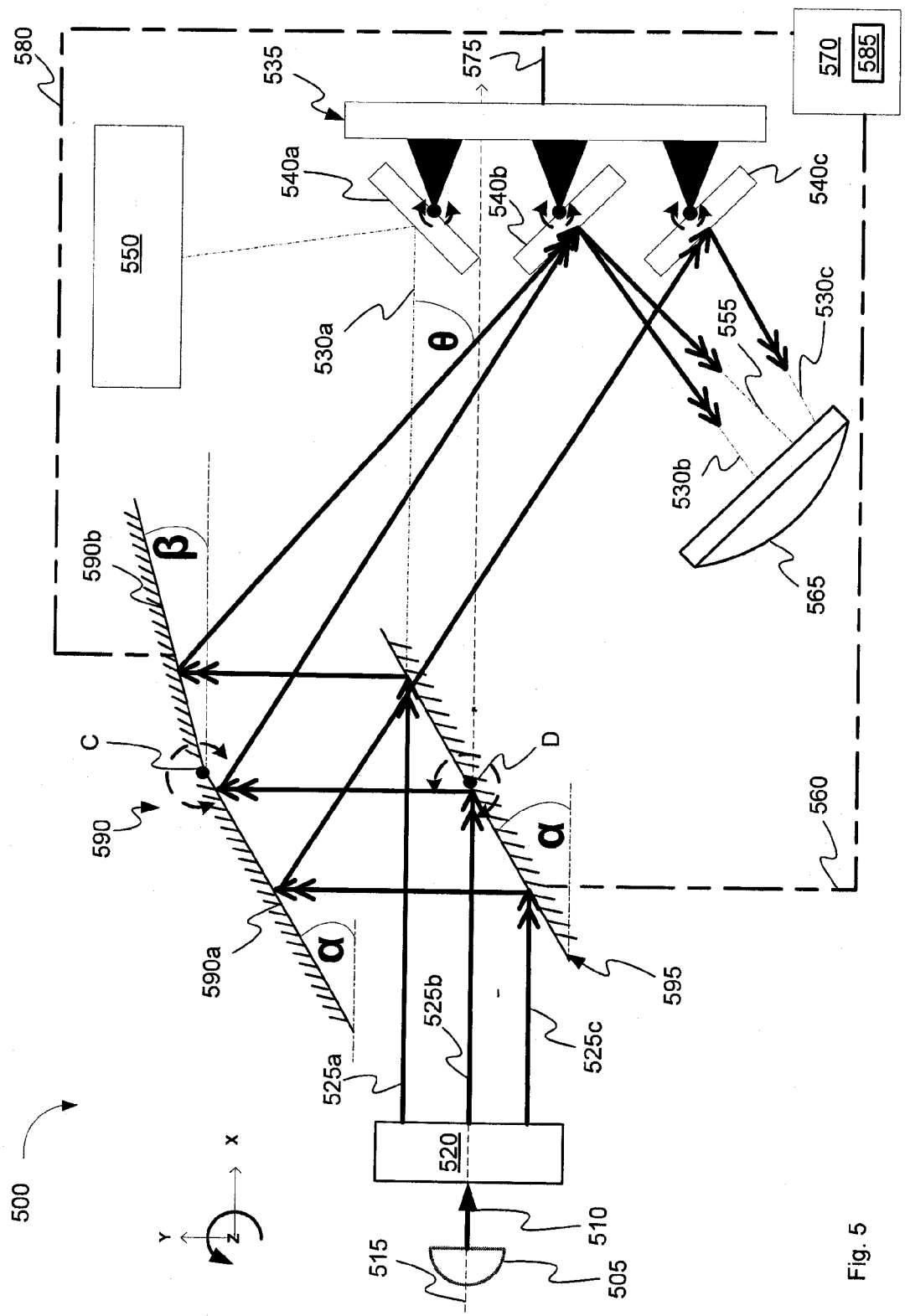
FIG. 5 depicts a schematic representation of a system for producing an image having high dynamic range, according to another non-limiting implementation.

Attention is directed to FIG. 5, depicting system 500 for producing an image having high dynamic range according to non-limiting implementations and comprising elements similar to FIG. 4, with like elements having like numbers, however starting with a "5" rather than a "4". For example, system 500 includes a light source 505 which provides or transmits light 510 along optical path 515. According to some implementations, light source 505 is a laser light module. According to other implementations, light source 505 comprises a lamp, such as a Xenon lamp having a parabolic reflector. Light 510 is received by intermediate optics 520, which modulates light 510 to produce light cones 525a, 525b and 525c along respective optical paths 530a, 530b and 530c, at least initially. As in system 400, DMD 535, comprised of mirrors 540a, 540b and 540c, referred to collectively as mirrors 540, directs light cones 525, as portions of light 510, to OFF-state and ON-state light paths, thereby producing an image.

System 500 includes two deformable optical elements, deformable optical element 590 and additional deformable optical element 595. In other words, an additional deformable optical element is disposed in an optical path, such as optical path 515 and/or optical path 530a, between light source 505 and DMD 535. Deformable optical element 590 comprises a segmented mirror having segments 590a and 590b. Segment 590a is a static element and segment 590b is steerable. For example, steerable segment 590b is pivotable about point C. According to some implementations, additional deformable optical element 595 comprises an analog mirror enabled to alter its position by rotating or pivoting about a point, such as point D. According to some implementations, additional deformable optical element 595 comprises a set of micromirrors, at least a subset of which are independently steerable, thereby altering the imaging state of the optical surface of additional deformable optical element 595. As shown in FIG. 5, static segment 590a and additional deformable optical element 595 are at an angle α ("alpha") to the x-axis and steerable segment 590b is positioned at an angle β ("beta") to the x-axis. According to some implementations, each one of static segment 590a, steerable segment 590b and additional deformable optical element 595 are positioned at different angles to any one of the x-axis, y-axis and z-axis.

Light cones 525a, 525b, 525c (referred to collectively as light cones 525) are received by deformable optical element 595 and reflected to deformable optical element 590. Light cones 525b and 525c are reflected by static segment 590b along optical paths 530b, 530c to mirrors 540b and 540c (both being in an ON-state). As shown in FIG. 5, and as previously stated, since optical paths 530b and 530c are directed towards ON-state mirrors (540b, 540c), and ultimately towards projection optics 565, optical paths 530b and 530c are considered ON-state light paths and vice-versa.

Light cone 525a is received by steerable segment 590b, and steered by reflection onto ON-state light path 555 at an angle of θ to optical path 530a (which is an OFF-state light path by virtue of being directed to an OFF-state mirror, mirror 540a, and/or directed such that light traversing that path does not travel to projection optics 565 to contribute to the produced image).

Similar to system 300, drive system 570 configures DMD 535 to produce the image based on image content data 585. Drive system 570 is in communication with DMD 535 via communication path 575. Similar to system 300, drive system 570 also configures deformable optical element 590 to steer at least some of light cones 525 (e.g. light cone 525a) from an OFF-state light path (e.g. 530a) to an ON-state light path (e.g. 555) based on image content data 585. Drive system 570 is in communication with deformable optical element 590 via communication path 580. As in system 300, communication paths 575 and 580 comprise any of one or more communication paths suitable for communication between drive system 570, DMD 535 and deformable optical element 590. For example, communication paths 575, 580 can comprise any combination of wired and/or wireless communication paths as desired.

Drive system 570 also configures additional optical element 595 to steer at least some of light cones 525 (e.g. light cone 525a) from an OFF-state light path (e.g. 530a) to an ON-state light path (e.g. 555) based on image content data 585. Drive system 570 is in communication with additional optical element 595 via communication path 560. Similar to communication paths 575 and 580, communication path 560 comprises any of one or more communication paths suitable for communication between drive system 570 and additional optical element 595. For example, communication path 560 can comprise any combination of wired and/or wireless communication paths as desired.

According to some implementations, one or more of the deformable optical element and additional deformable optical element comprise a transmissive element. According to some implementations, one or more of the deformable optical element and additional deformable optical element comprise an at least partially reflective element. For example, one or more of the optical element and additional deformable optical element comprise a dichroic mirror or filter. According to some implementations, one or more of the deformable optical element and additional deformable optical element comprise a fully reflective element.

As would be understood, any one of deformable optical elements 390, 490 and 590 can take many forms. For example, according to some implementations, deformable optical elements 390, 490 and 590 can comprise a square shape, a rectangle shape and a circle shape. According to some implementations, additional deformable optical element 595 can comprise a square shape, a rectangle shape and a circle shape. According to some implementations, any one of deformable optical elements 390, 490, 590 and additional deformable optical element 595 can be rotated or tilted to achieve the desired light steering.

Figure 6:
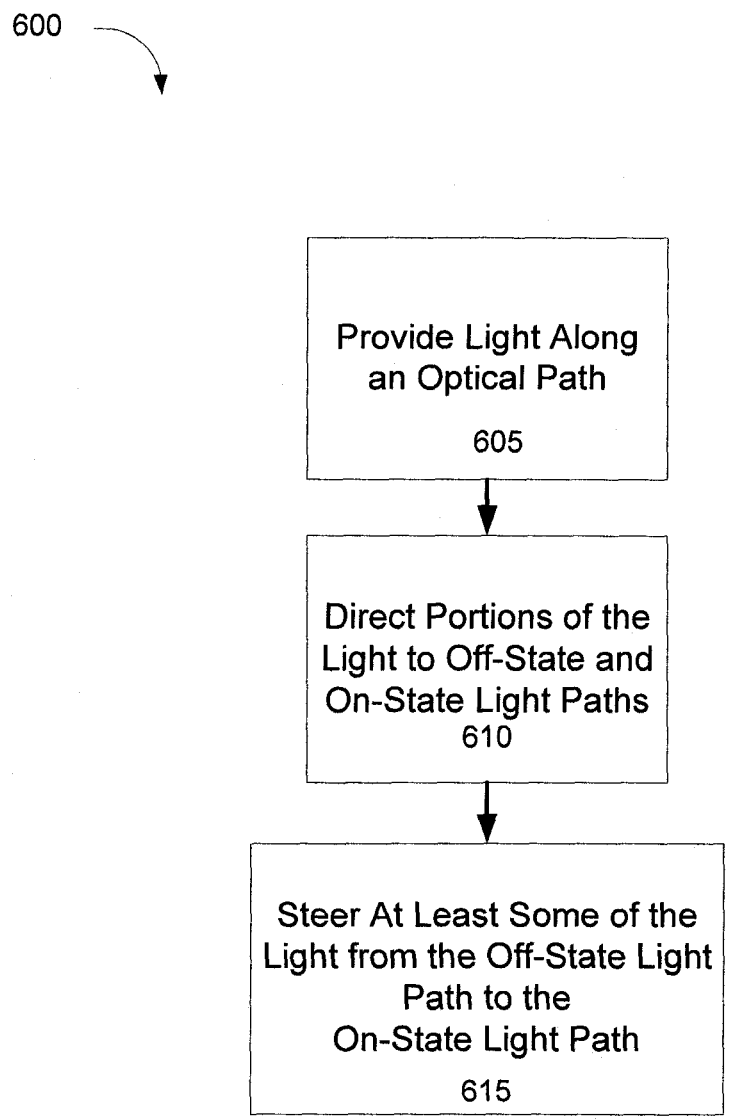
FIG. 6 depicts a flowchart of a method for producing an image having high dynamic range, according to a non-limiting implementation.

Attention is now directed to FIG. 6 which depicts a flowchart of method 600 for producing an image having high dynamic range, according to non-limiting implementations. In order to assist in the explanation of method 600, it will be assumed that method 600 is performed using systems 300. Furthermore, the following discussion of method 600 will lead to a further understanding of system 300 and its various components. However, it is to be understood that system 300 and/or method 600 can be varied, and need not work exactly as discussed herein in conjunction with each other, and that such variations are within the scope of present implementations. Furthermore, it will be understood that method 600 can be implemented by systems 400 and 500.

It is to be emphasized, however, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of systems 300, 400 and 500 as well. For example, method 600 could employ more than two deformable optical elements.

At block 605, light is provided along an optical path. For example, light 310 is provided by light source 305 along optical path 315.

At block 610, portions of the provided light are directed to OFF-state and ON-state light paths, thereby producing an image. For example, DMD 335, through operation of mirrors 340a, 340b and 340c, directs light cones 325b, 325c and portion of light cone 325a" to projection optics 365 and remainder 325a' to light dump 350 to produce an image.

At block 615, at least some of the light from the OFF-state light path is steered to the ON-state light path. For example, light cone 325a, initially travelling along optical path 305a (also considered OFF-state light path 305a) is steered such that at least portion of light cone 325a" travels along ON-state light path 355.

Systems 300, 400, 500 and method 600 can yield many advantages. Since the image comprises light steered from an OFF-state light path, instead of only light that was initially destined to an ON-state light path, the dynamic range of the produced image is increased. For example, since DMD 335, and ultimately projection optics 365, utilize light cones 325b, 325c and portion of light cone 325a", more light overall is contributing to the image than, for example, in prior art projection system 100 in which only light cones 125b and 125c contributed to the produced image. Since less light that is transmitted by the light source is diverted to the light dump or is otherwise not being utilized to produce the image, the result is a more efficient use of system resources and energy. Furthermore, since less light is directed OFF-state than many prior art projection systems, reliance on elements included for the specific purpose of directing or guiding this light OFF-state, such as additional DMDs, is reduced and, in some cases, eliminated. This can result in less overall system complexity.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for producing an image having high dynamic range, comprising:
    a light source for providing light along an optical path;
    a digital micromirror device for directing portions of the light to off-state and on-state light paths, thereby producing an image; and
    a deformable optical element disposed in the optical path between the light source and the digital micromirror device for steering at least some of the light from being directed to the off-state light path to the digital micromirror device to the on-state light path to the digital micromirror device to increase dynamic range of the image produced by the digital micromirror device.

2. The system of claim 1, wherein the deformable optical element comprises at least one steerable segment.

3. The system of claim 2, wherein the at least one steerable segment is independently steerable.

4. The system of claim 1, wherein the deformable optical element comprises at least one static element.

5. The system of any claim 1, wherein the deformable optical element comprises an at least partially reflective element.

6. The system of claim 5, wherein the at least partially reflective element comprises one of a segmented mirror, an analog mirror, a dichroic mirror and an electrostatic deformable mirror.

7. The system of claim 1, wherein a shape of the deformable optical element comprises one of a square, a rectangle and a circle.

8. The system of claim 1, wherein the deformable optical element is configured to steer the at least some of the light from the off-state light path between +/−9 degrees to the off-state light path.

9. The system of claim 1 further comprising:
    a drive system for configuring the digital micromirror device to produce the image based on image content data; and
    wherein the drive system configures the deformable optical element to steer the at least some light from the off-state light path to the on-state light path based on the image content data.

10. The system of claim 9, wherein the image content data comprises high dynamic image content data.

11. The system of claim 1 further comprising an additional deformable optical element disposed in the optical path between the light source and the digital micromirror device.

12. The system of claim 1, wherein the light source comprises a laser light module.

13. A system for producing an image having high dynamic range, comprising:
    a light source for providing light along an optical path;
    a digital micromirror device for directing portions of the light to off-state and on-state light paths, thereby producing an image; and
    a deformable optical element disposed in the optical path between the light source and the digital micromirror device for steering at least some of the light from the off-state light path to the on-state light path to increase dynamic range of the image produced by the digital micromirror device, wherein the deformable optical element comprises a transmissive element, wherein the transmissive element comprises a lens, wherein the lens comprises a liquid-crystal variable lens.

14. A method for producing an image having high dynamic range, comprising:
    providing light along an optical path;
    directing portions of the light to off-state and on-state light paths, thereby producing an image; and
    steering at least some of the light from being directed to the off-state light path to the on-state light path to increase dynamic range of the image.

15. The method of claim 14, wherein the steering comprises steering the at least some of the light from the off-state light path between −+/−9 degrees to the off-state light path.

16. The method of claim 14, wherein the steering comprises articulating at least one steerable segment of a deformable optical element disposed in the optical path.

* * * * *